(12) United States Patent
Simpson et al.

(10) Patent No.: US 6,604,020 B1
(45) Date of Patent: Aug. 5, 2003

(54) TEACH TOOL

(75) Inventors: Mark Simpson, Brampton (CA); Anthony J. Osborne, Brampton (CA); John LeBlanc, Brampton (CA); Michael Roy, Brampton (CA)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/534,658

(22) Filed: Mar. 24, 2000

(51) Int. Cl.$^7$ ............................................... G06F 19/00
(52) U.S. Cl. ...................... 700/245; 700/258; 288/102
(58) Field of Search .................. 700/245, 258, 700/261; 29/429; 901/1, 7; 318/568; 288/102, 261

(56) References Cited

U.S. PATENT DOCUMENTS

| | | | |
|---|---|---|---|
| 3,656,224 A | 4/1972 | Blair et al. .................. 288/181 |
| 3,829,017 A | 8/1974 | Napor et al. ................. 239/135 |
| 3,875,364 A | 4/1975 | Boyett .......................... 219/74 |
| 4,390,775 A | 6/1983 | Biava et al. ............. 219/124.34 |
| 4,441,012 A | 4/1984 | Risbeck et al. ............. 219/124 |
| 4,588,872 A | 5/1986 | Bollinger et al. ........... 118/676 |
| 4,669,168 A | * 6/1987 | Tamura et al. ................. 29/429 |
| 4,675,502 A | * 6/1987 | Haefner et al. ......... 219/124.34 |
| 4,848,271 A | 7/1989 | Clark .......................... 700/248 |
| 4,998,050 A | 3/1991 | Nishiyama et al. .......... 700/264 |
| 5,025,393 A | 6/1991 | Naito .............................. 435/6 |
| 5,425,132 A | * 6/1995 | Nakamura .................... 700/245 |
| 5,538,850 A | 7/1996 | King et al. .................. 219/136 |
| 5,614,117 A | 3/1997 | Krobath ....................... 219/147 |
| 5,714,735 A | 2/1998 | Offer ............................ 219/75 |
| 5,793,009 A | 8/1998 | Offer |
| 6,277,898 B1 | * 8/2001 | Pachl et al. .................. 522/100 |

\* cited by examiner

*Primary Examiner*—Leo Picard
*Assistant Examiner*—Kidest Bahta
(74) *Attorney, Agent, or Firm*—Donald J. Wallace

(57) ABSTRACT

A pointer to teach a robot to repetitively manipulate a brazing nozzle is provided. In a preferred embodiment, the pointer allows the robot to manipulate the brazing nozzle at a preselected work distance away from a surface along a multi-dimensional path on a complex work piece. The pointer includes a base portion for connection with an end of a robot arm. The pointer additionally has a main body having a length inclusive of the base portion approximating the length of the brazing nozzle and the preselected work distance of the brazing nozzle away from the work piece. A contact portion of the pointer is continuous with the main body and is provided for contacting the work piece. The contact portion has two small parallel spaced surface flats. The surface flats of the contact portion are generally aligned in a common plane at the preselected work angle with respect to the robot arm. The flats are separated by a window cut out to allow an operator who is programming the robot to visually inspect an instantaneous surface of the work piece which is juxtaposed by the flats.

8 Claims, 2 Drawing Sheets

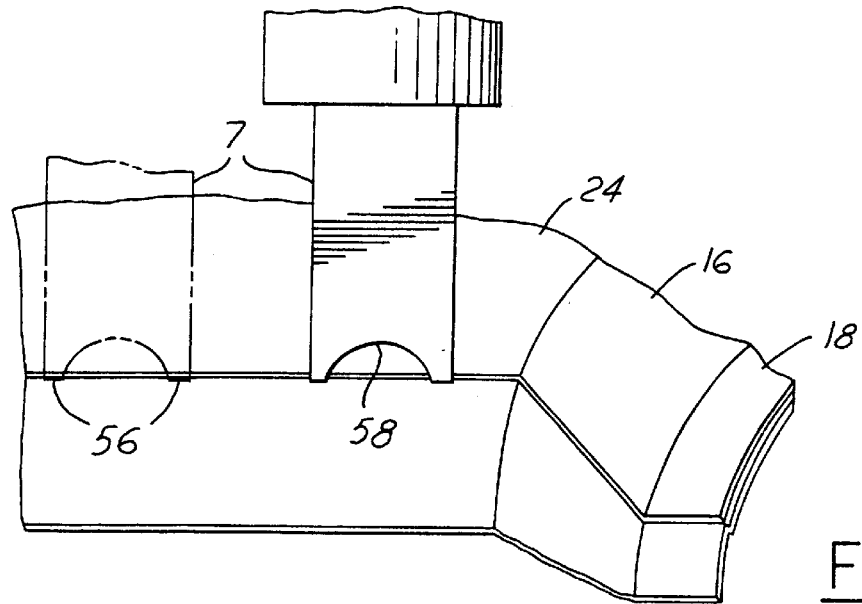
FIG. 5
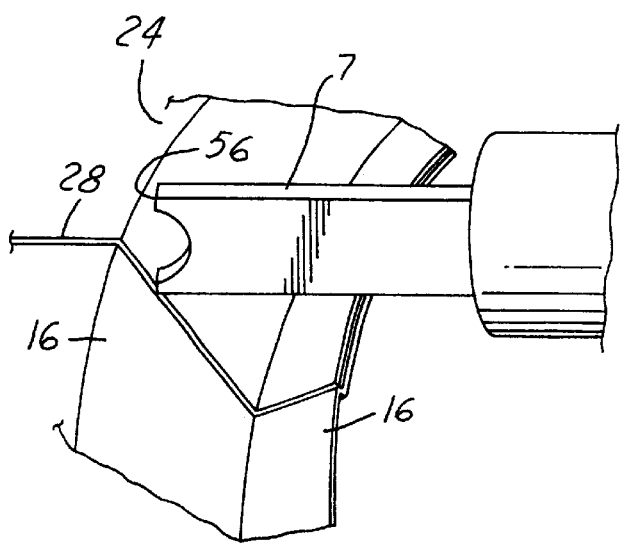
FIG. 6
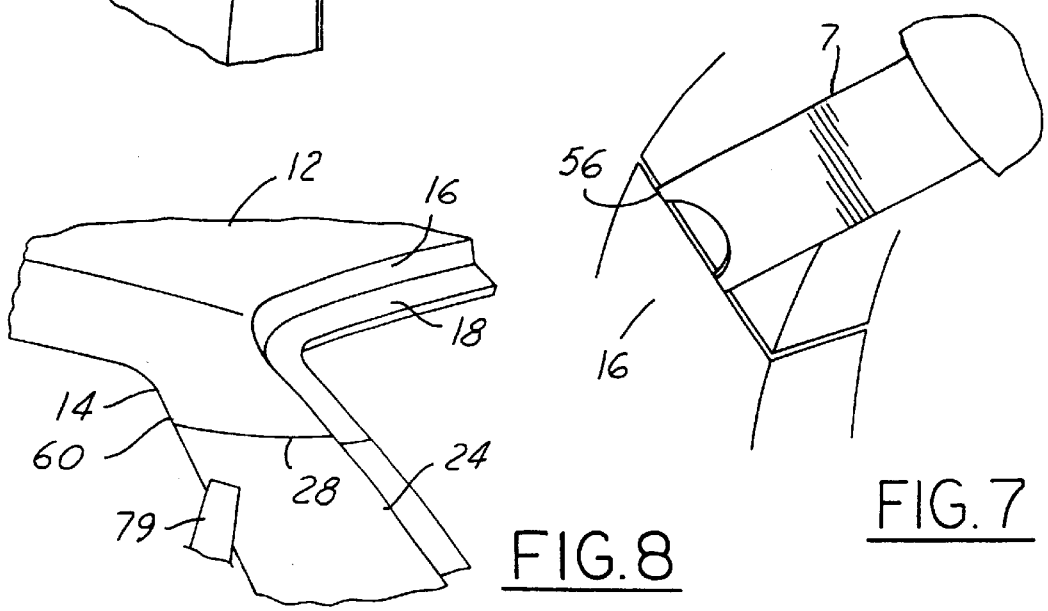
FIG. 8
FIG. 7

TEACH TOOL

FIELD OF THE INVENTION

The field of the present invention is that of teach tools for teaching a programmable robot to follow a prescribed multi-dimensional path along a three dimensional work piece. More particularly the present invention relates to a pointer which allows an operator to teach a programmable robot to follow a multidirectional path along a three dimensional work piece while keeping an end of arm tool at a prescribed angle with respect to an instantaneous surface of the work piece and also to keep the tool at a fixed distance away from the instantaneous surface of the work piece.

BACKGROUND OF THE INVENTION

Most automotive vehicles have a roof. The roof of the automotive vehicle is typically joined to the remainder of the car body by at least a pair of transversely spaced front and rear pillars. The front pillars which are adjacent to the windshield are referred to as the A pillars. The rear pillars which are adjacent to the rear window opening are typically referred to as the C pillars.

The C pillar's outer body is formed from two large sheet metal stampings. The first stamping is the roof panel. The second stamping is a rear quarter panel. The roof panel has an integral portion forming a depression for placement of the rear glass window pane and for forming an upper portion of the C pillar.

The roof panel portion of the C pillar is typically placed in an over-lapping manner in connection with a C pillar portion of the rear quarter panel. The rear quarter panel also has a depression for the rear window pane. The rear quarter panel additionally forms the rear door opening and the rear side panel of the vehicle. For aesthetic reasons, it is typically desired that the C pillar appear to be one continuously formed piece of sheet metal.

To cover up the seam overlap between the roof panel C pillar portion and the quarter panel C pillar portion, brazing is typically applied. After the brazing solidifies, a grinder is applied to smooth out the brazing to provide a smooth transition between the sheet metal of the C pillar which is integral with the roof panel and the sheet metal which is integral with the rear quarter panel. After the grinding operation and subsequent painting of the vehicle the seam line between the two sheet metal portions of the C pillar becomes virtually indistinguishable.

In the most recent two decades, efforts have been made to utilize robots to perform the brazing operation. To project the brazing (sometimes referred to as solder) upon the C pillar there is a device which is typically referred to as a brazing nozzle. The brazing nozzle projects liquefied silicon brazing material onto the C pillar. The C pillar on most vehicles has a surface curvature in the fore and aft direction and also has a curvature in the transverse direction of the vehicle as well as the vertical direction.

Accordingly, the brazing gun at the end of the robot must follow a complex multi-dimensional path. The brazing nozzle should be maintained at a perpendicular orientation with respect to the surface of the C pillar. Additionally, the brazing nozzle should also be positioned at a constant distance from the surface of the C pillar to provide an even disposition of brazing and also to prevent excessive heat transfer to the C pillar which could inadvertently warp or damage the sheet metal of the C pillar.

Emperical experience has shown that the complex geometrical shapes of the C pillar make a purely mathematical modeling of the path of the robot to be unworkable. Accordingly, to program the robot a teach tool is utilized. When using a teach tool an operator will physically manipulate the robot in the desired path of operation. The motion imparted to the robot will be transferred to its controller and the robot will "memorize" the path followed by the teach tool. Thereafter the robot can follow the prescribed path in a repeatable fashion.

Prior to the present invention, a rod like pointer was used as the teach tool for the robot. When using a rod pointer, sometimes inadvertently the operator teaching the robot would not have the pointer perpendicular to the instantaneous surface of the C pillar. Because the pointer as not perpendicular to the surface, several problems would occur when the robot was brazing the C pillar using the brazing nozzle. When the nozzle was not perpendicular to the surface, the brazing is sometimes misapplied and whenever the pointer is not perpendicular to the surface, the distance from the brazing nozzle to the surface of the C pillar is not constant.

Such a non-constant or variable distance causes the brazing to be misapplied and can sometimes inadvertently cause the sheet metal of the C pillar to be overexposed to heat causing it to warp or bend. To compensate for the lack of a constant distance of the brazing gun away from the sheet metal surface typically an excess amount of brazing was applied. The excess amount of brazing was undesirable since additional brazing time causes an increase in production time. Also, the additional brazing mandates additional production time for the grinding operation to smooth out the brazing.

It would be desirable to provide a teach tool which would ensure that an end of arm tool such as a brazing nozzle can be robotically manipulated on a resetting work piece along a multi-dimensional path while at the same time keeping a constant perpendicular angle to an instantaneous surface of the C pillar and also being at a constant distance therefrom.

SUMMARY OF THE INVENTION

The present invention provides a pointer to teach a robot to repetitively manipulate an end of arm tool such as a brazing nozzle having a predetermined length along a multi-dimensional path on a resetting work piece as provided by a C pillar of an automotive vehicle body. The pointer is utilized to teach the robot to keep the brazing nozzle at a generally perpendicular work angle and at a preselected work distance away from instantaneous surface of the C pillar along the multi-dimensional path.

The invention includes a base portion connecting the pointer with an end of a robot arm. A main body having an elongated form with a generally rectangular cross-section is connected with the base portion. The main body has a length inclusive of the base approximating the predetermined length of the brazing nozzle and the preselected desired work distance of the brazing nozzle away from the surface of the C pillar.

A contact portion which is continuous and integral with the main body is provided for contacting the C pillar. The contact portion has two small parallel spaced surface flats which are generally aligned in a common plane perpendicular with respect to the robot arm. The flats are separated by a window cut out to allow an operator to visually inspect the instantaneous surface of the C pillar juxtaposed by the flats.

It is an object of the present invention to provide a pointer which can be utilized in teaching a robot to manipulate an end of arm tool such as a brazing gun at a constant distance along a multi-dimensional path along a three-dimensional work piece.

It is also an object of the present invention to provide a pointer which can be used to teach a robot to repetitively manipulate an end of arm tool such as a brazing nozzle at a constant angle with respect to an instantaneous surface of a three-dimensional object along a multi-dimensional work path.

The above-noted objects of the present invention will become apparent to those skilled in the art from a review of the invention as it is provided in the accompanying drawings and detailed description of the invention.

BRIEF DESCRIPTION OF SEVERAL VIEWS OF THE DRAWINGS

FIG. 5 is an operative view of the pointer being utilized in teaching the robot to proceed along the seam of the C pillar.

FIG. 6 is an operational view similar to that of FIG. 5 illustrating a position of the pointer allowing the operator to realize that the robot is in an improper position with respect to an instantaneous surface of the C pillar.

FIG. 7 is a view similar to that of FIG. 5 illustrating the use of the pointer of the present invention for programming the robot for travel of the brazing nozzle when brazing the portion of the seam between the roof panel and the quarter panel wherein a depression is made to accept the rear window glass pane.

FIG. 8 is a schematic view of the pointer shown in FIGS. 1–6 illustrating the various portions of the C pillar from the rear door opening to the depression for placement of the rear window glass.

DETAILED DESCRIPTION OF THE INVENTION

Figure 1:
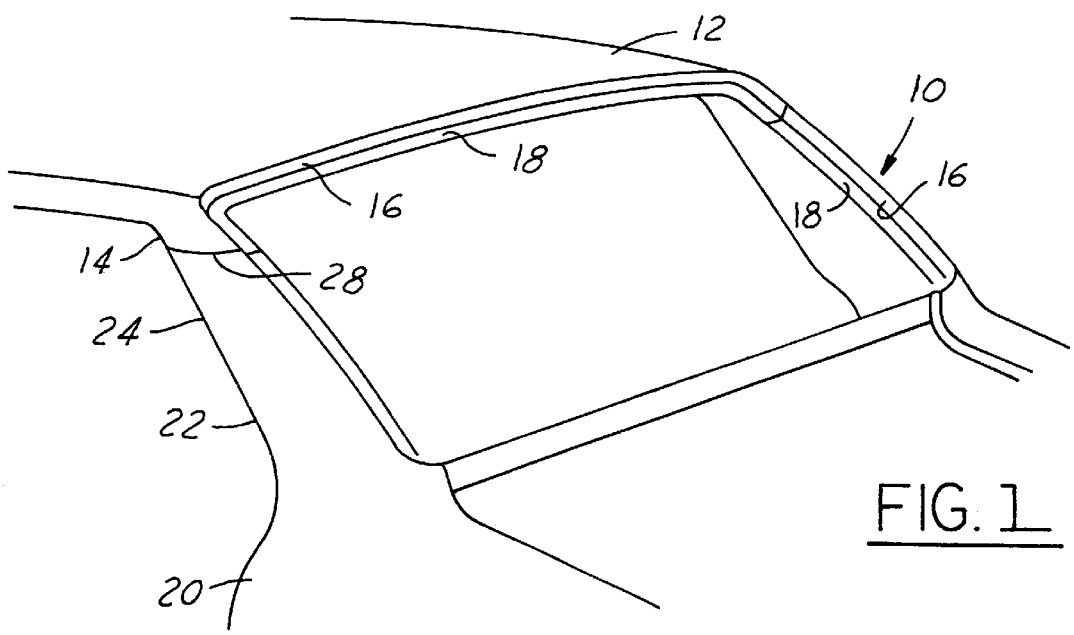
FIG. 1 is a perspective view of an automotive vehicle body illustrating a C pillar which includes extensions of a roof panel and a rear quarter panel.
Figure 2:
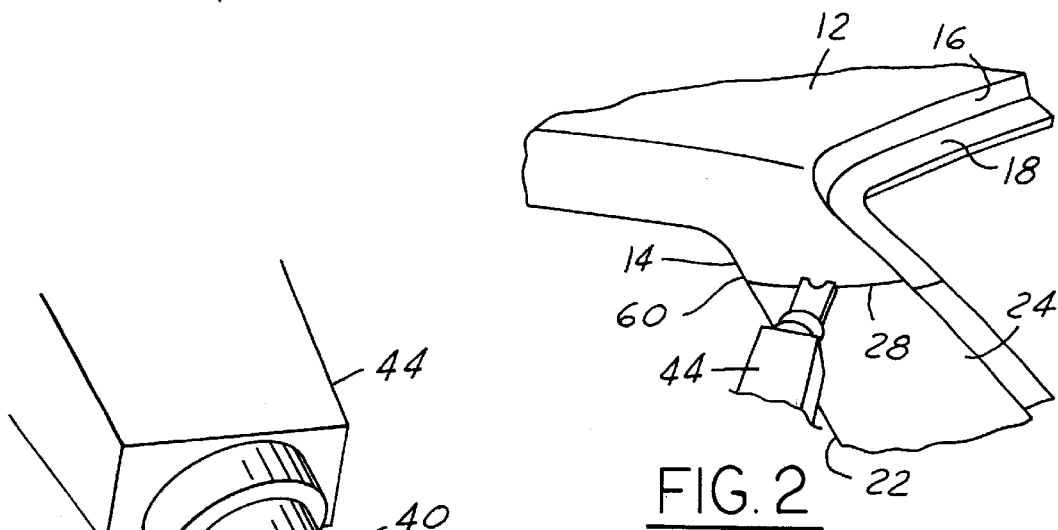
FIG. 2 illustrates a preferred embodiment pointer according to the present invention being utilized on a seam between the rear quarter portion of the C pillar and the overlapping C pillar portion of the roof panel.
Figure 3:
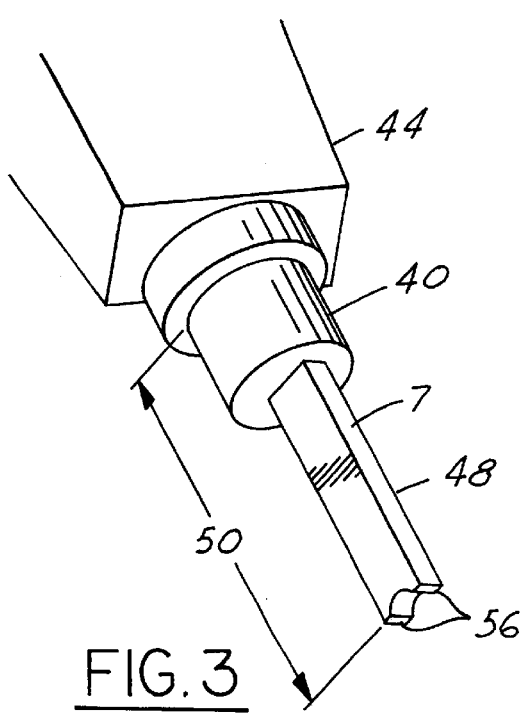
FIG. 3 is a perspective view of the pointer of the present invention.
Figure 4:
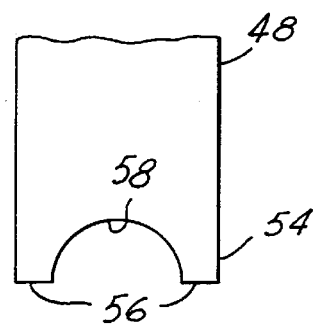
FIG. 4 is a partial front elevational view of the pointer shown in FIGS. 3 and 2.

Referring to FIGS. 1 and 2, a work piece utilized with the present invention is provided by an automotive vehicle body 10. The automotive vehicle body 10 is positionally reset by a conveyor belt or an automatic guided vehicle. The automotive vehicle body 10 has a roof panel stamping 12. The roof panel at the extreme rear end has an integral extension 14. Stamped into the roof panel is a depression having a side surface 16 which abuts an edge of the rear window glass pane (not shown) and a window glass support surface 18. Also forming part of the car body 10 is a rear quarter panel 20. The rear quarter panel forms the rear side of the vehicle. The rear quarter panel 20 has an extension 22. The roof panel extension 14 and the rear quarter extension 22 combine to form the sheet metal of the C pillar 24. In a manner similar to the extension 14, the rear quarter panel extension 22 has a glass depression formed by side member 16 and a glass support 18.

The extension 14 of the roof panel overlaps the extension 22 of the rear quarter panel by approximately 15 mm. The C pillar has a curvature in the fore and aft direction of the vehicle and in the transverse direction of the vehicle. Additionally, the C pillar will often have a slight curvature in the vertical direction. Accordingly, the seam line 28 is a complex multi-dimensional path.

Referring additionally to FIGS. 3–7 to aid in the teaching of the robot in programming a path for a brazing nozzle, there is provided a pointer 7. The pointer 7 has a base portion 40. The pointer base portion 40 is provided to connect the pointer 7 with an end of a robotic arm 44. A main body 48 of the pointer is connected with the base portion 40. The main body 48 has a length 50 inclusive of the base portion approximating a predetermined length of the brazing nozzle end of the arm tool and the preselected desired work distance of the brazing tool from an instantaneous surface of the C pillar. The main body 48 shown in the embodiment of FIGS. 2–8 has an elongated form with a generally rectangular cross-section.

The pointer 7 has a contact portion 54 which is continuous and integral with the main body 48. The contact portion 54 is provided for contacting the surface of the C pillar 24. The contact portion 54 has two parallel space surface flats 56. The surface flats 56 are generally aligned with each other in a common plane perpendicular with respect to the robot arm 44. In an embodiment not shown the flats 56 can be at an alternative angle with respect to the robot arm such as but not limited to 85 or 30 degrees. To allow an operator to visually inspect an instantaneous portion of the surface of the C pillar which is juxtaposed by the flats 54 there is provided a window cut out 58. In the embodiment shown, the window cut out 58 is a semi-circle however, other cut out shapes may be utilized.

Referring to FIG. 8, the schematic view is shown which illustrates the path of the pointer 7 in an area of the C pillar adjacent to the seam line 28. A section 60 of the seam line 28 is provided along the rear door opening 60 of the C pillar. The seam line 28 also proceeds along the out board surface 62 of the C pillar. The seam line 28 proceeds to the window glass depression formed by the side surface 16 and the glass support 18.

Along the seam 28 there are various robotic programmable work points 72 which are preprogrammed into the work path which is adjacent to the seam 28. The robot may be programmed to selectively turn off the brazing gun or pause to prevent excessive heat or brazing material along certain work points 72. The robot will have multiple passes adjacent to the seam 28 however, only the programming for one pass is being shown.

FIGS. 2, 5 and 6 shown an operational view of the pointer 7 being moved by an operator to program the path for the robot. The flats 56 are placed in contact with the surface of the C pillar 24. The contact of the flats 56 with the surface the C pillar 24 ensures that the pointer 7 is perpendicular to the surface. The cut-out window 58 allows the operator programming the robot to see the instantaneous portion of the surface of the C pillar 24 that is juxtaposed by the flats 56.

When one of the flats 56 is lifted away from the surface of the C pillar 24 (FIG. 6), the operator will instantaneously realize that the robot path is being improperly programmed such that the length of the brazing nozzle away from the surface or the angular orientation of the brazing nozzle with respect to the surface is improper. The need for complex instrumentation is eliminated since the operator can instantly realize that the flats 56 are not in contact with the surface of the C pillar 24.

FIG. 7 illustrates the proper orientation of the pointer 7 with the side surface 16 of the window depression, as in FIG. 5. The flats 56 of the pointer 7 are in contact with the surface of the C pillar 24, that the brazing nozzle will be at the correct orientation and distance away from the C pillar. If desired, the main body 48 of the pointer 7 can be made transparent to aid in viewing the surface while the pointer is being utilized to program the robot.

The present invention, teaching tool pointer has been shown in a preferred embodiment. However, it is apparent to those skilled the art that various modifications can be made to the present invention without departing from the spirit or scope of the present invention as it is encompassed in the specification and drawings and by the following claims.

What is claimed is:

1. A pointer utilized to teach a robot to repetitively manipulate an end of an arm tool having a preselected length along a multi-dimensional path on a resetting work piece at a generally constant preselected desired work angle and work distance from an instantaneous surface of said work piece along said multidimensional path, said pointer comprising:

a base portion to connect said pointer with an end of a robot arm;

a main body connected with said base portion having a length inclusive of said base portion approximating said preselected length of said end of arm tool and said preselected work distance; and a contact portion continuous with said main body for contacting said work piece, said contact portion having two small parallel spaced surface flats generally aligned in a common plane at said preselected work angle with respect to said robot arm, said flats being separated by a window cut-out to allow an operator to visually inspect said instantaneous surface of said work piece juxtaposed by said flats.

2. A pointer as described in claim 1 wherein said flats are in a plane perpendicular to said robot arm.

3. A pointer as described in claim 1 wherein said end of arm tool is a brazing nozzle.

4. A pointer as described in claim 1 wherein said pointer is adapted to be utilized on an automobile vehicle body work piece.

5. A pointer as described in claim 4 wherein said automotive body work piece is a C Pillar joining a roof panel to a quarter panel.

6. A pointer as described in claim 1, wherein said pointer is fabricated from a transparent material.

7. A pointer to use to teach a robot to repetitively manipulate a brazing nozzle of a preselected length along a multi-dimensional path on a resetting work piece provided by a C pillar of an automobile vehicle body at a generally perpendicular work angle and at a preselected work distance from an instantaneous surface of said C pillar along said multi-dimensional path, said pointer comprising:

a base portion connecting said pointer with an end of a robot arm;

a main body having an elongated form with a generally rectangular cross-section, said main body being connected with said base portion having a length inclusive of said base approximating said preselected length of said brazing nozzle and said preselected work distance; and a contact portion continuous and integral with said main body for contacting said C pillar, said contact portion having two small parallel space surface flats generally aligned in a common plane perpendicular with respect to said robot arm, said flats being separated by a window cut-out to allow an operator to visually inspect said instantaneous surface of said C pillar juxtaposed by said flats.

8. A method of using a pointer to teach a robot to repetitively manipulate an end of arm tool having a preselected length along a multidimensional path on a resetting work piece at a generally constant preselected desired work angle and work distance from an instantaneous surface of said work piece along said multi-dimensional path, said method comprising:

connecting a base of said pointer with an end of a robot arm;

connecting with said pointer base portion a main body of said pointer having a length inclusive of said base portion approximating said preselected length of said end of arm tool and said preselected desired work distance;

connecting with said main body a contact portion continuous with said main body for contacting said work piece, said contact portion having two small parallel space surface flats generally aligned in a common plane at said preselected work angle with respect to said robot arm, said flats being separated by a window cut-out to allow an operator to visually inspect said instantaneous surface of said work piece juxtaposed by said flats; and contacting said work piece with said pointer while moving said robot arm.

\* \* \* \* \*